Nov. 2, 1926.  
A. BACKUS  
1,605,319  
SHOCK ABSORBER  
Filed July 30, 1923

Inventor:  
Albert Backus,  
By Hugh H. Wagner,  
Attorney

Patented Nov. 2, 1926.

1,605,319

UNITED STATES PATENT OFFICE.

ALBERT BACKUS, OF ST. LOUIS, MISSOURI.

SHOCK ABSORBER.

Application filed July 30, 1923. Serial No. 654,722.

This invention relates to rebound shock preventers for motor vehicles, and pertains particularly to that type of shock preventer which allows the springs of the motor vehicle to compress normally without check to absorb the jars of travel, but which acts as a brake on the rebound, and thereby prevents a series of oscillations and dangerous deflections.

This invention consists generally of a strip of belting serving as a single-acting band-brake against a drum or axle of the car, the belt being held taut by the action of a spring. When the car springs are compressed, the action of both the car and belt springs is such that the belt passes freely over the drum; but any tendency of the car springs to rebound is resisted by the friction of the belting against the drum. This frictional resistance can be adjusted by means of a buckle on the belting.

In the accompanying drawings forming part of this specification, in which like numbers of reference denote like parts wherever they occur, Figure 1 is an elevation looking at the rear end of a motor vehicle, depicting the preferred form of this invention and so much of the motor vehicle as is necessary to show its connection therewith, one end being shown in section on the line 1—1 and the other end on the line 1¹—1¹ of Figure 2;

Figure 1:
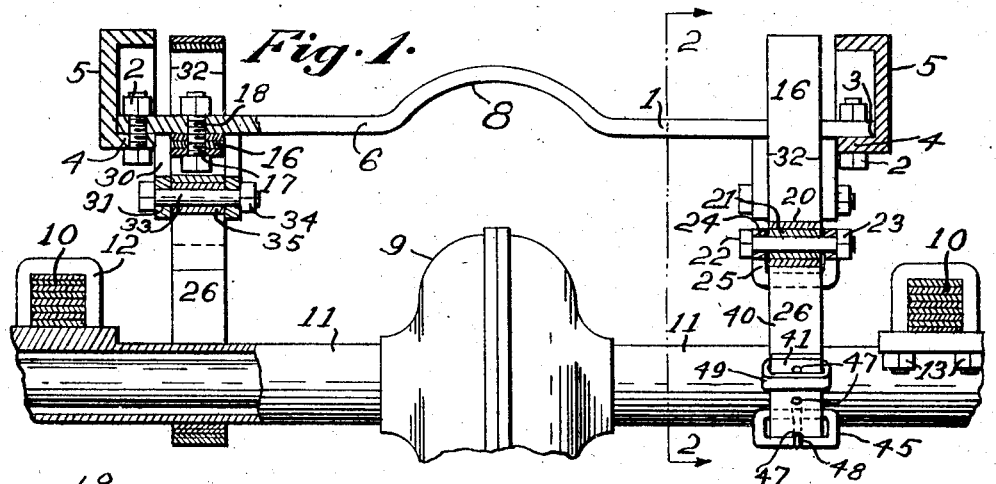
Figures 2, 3:
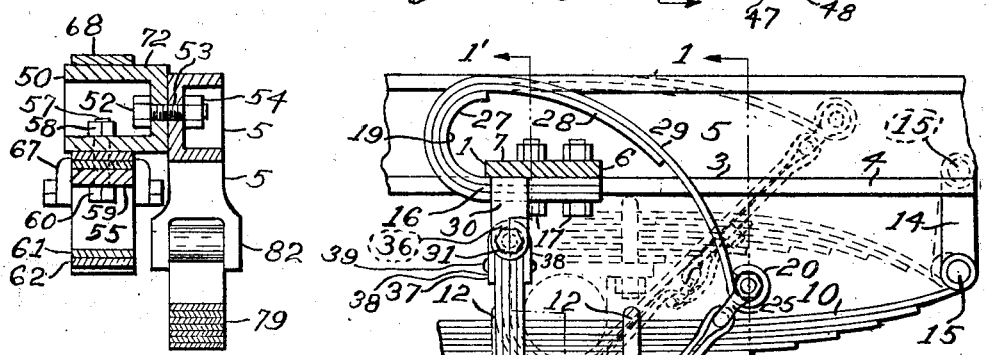
Figure 2 is a vertical section taken on the line 2—2 of Figure 1.
Figure 3 is a vertical section taken on the line 3—3 of Figure 4.

Referring now to the preferred form of this invention as shown in Figures 1 and 2, a cross-member 1 is secured by means of bolts 2 to the upper sides 3 of the lower flanges 4 of the frame side members 5 of a motor vehicle. Cross-member 1 has its thickness 6 extending vertically, and its width 7 horizontally, there being a rising curve 8 midway of its length for the purpose of clearing the differential housing 9 of the vehicle, as may become necessary when housing 9 approaches cross-member 1 during the compression of the rear car springs 10. Differential housing 9 is secured to rear axle or rear axle housing 11, which is supported from the rear car-laminated-leaf-springs 10 by the clips or U-bolts 12, having nuts 13. The leaf-springs 10 are secured to the frame side-members 5 in the usual manner by means of shackles 14 and bolts 15.

On the underside of the cross-member 1 are supported, one near each of the frame side-members 5, the laminated-leaf-springs 16, by means of bolts 17, passing through holes 18 in the leaf-springs 16 and the cross-member 5. The leaf-springs 16 extend forward from the underside of the cross-member 1, and then curve upward and backward at 19 over the cross-member 1 and terminate in a curled over-portion 20, which forms an eye for the reception of a bushing 21, through which extends a bolt 22 with nuts 23, passing also through the eyes 24 of a clevis 25, for holding a belt 26, to be hereinafter referred to. The leaf-springs 16 are shown with three leaves, although any suitable number may be used, all three leaves 27, 28, and 29 extending under the cross-member 1 and through the curve 19, the outer leaf 29 being longest, the inner 27 shortest, and the intermediate leaf 28 extending to an intermediate point.

Four lugs 30, having eyes 31, are secured to the under side of the cross-member 1 in any common manner, being preferably welded thereto, and there being one lug opposite each side 32 of each of the two leaf springs 16. Bolts 33 having nuts 34 pass through eyes 31 and through bushing 35, preferably of fiber to prevent squeaking when the bushing 35 turns about the bolts 33. Bushing 35 is secured by a tight fit in the loop 36 of a U-shaped metal strap 37, between the side members 38 of which are riveted at 39 to the belt strands 40, 41, 42, and 43 of the belt 26. The belt 26 may be constructed of any suitable material and may be of any suitable thickness, and extends downwardly from the strap 37 and around the underside of the axle 11 and thence up to the clevis 25. When the axle 11 moves from the position shown in dotted lines to that in full lines in Figure 3, the tension on the belt 26 between the clevis 25 and the friction surface 44 of the axle 11 is principally due to that of the spring 16 alone, the tension on the belt 26 increasing progressively around the axle 11 because of the friction of the belt 26 on the axle 11, and the tension being greatest on that part of the belt between the axle 11 and the strap 37. For this reason it is desirable to make the belt thicker at the strap 37 than at the clevis 25, tapering it gradually from the thick end to the thin end, the thin end forming a loop around the clevis 25 and consisting of the strands 40 and 41 which are increased in thickness at the strap 37 by the added layers 42 and 43. A buckle 45 connecting the strands 40 and 41 provides means for varying the combined length of the strands 40 and 41 and thereby adjusting the tension of the leaf spring 16. The buckle 45 is secured to the loop 46 at the end of the strand 40, and the free end of the strand 41 has a series of holes 47 which co-operate with the pivoted locking tongue 48 of the buckle 45. The end of strand 41 is held in strap 49 of strand 40.

The mode of operation of this device will now be described. Normally the parts are in the position represented by full lines in Figure 2. When the wheels of the car strike an obstruction or unevenness in the road, the axle is carried up as shown in dotted lines in Figure 2. As this action occurs, the belt 26 passes around the axle 11 in a counter-clockwise direction and the leaf-spring 16 is permitted to return to its normal position, as shown in dotted lines. The leaf-spring 16 assists the upward movement of the axle 11, whilst the friction of the belt 26 thereon tends to retard it, the two opposite effects more or less neutralizing one another, so that the upward movement of the axle 11 is practically unimpeded by this device. However, during the rebound of the axle 11 relatively to the frame 5 of the car, caused by the tendency of the car spring 10 to release to its normal position, the belt 26 passes around the axle 11 in a clockwise direction, tension being exerted on the belt 26 from both of its ends, thereby increasing considerably the friction of the belt 26 on the axle 11, and consequently effectively damping the rebound, and thus preventing a series of oscillations. The cross-member 1 precludes the possibility of severe torsional stresses along the frame side members 5, as might occur if the leaf-spring 16 and strap 37 were secured to a side bracket extending from the frame side-members 5.

Figure 4:
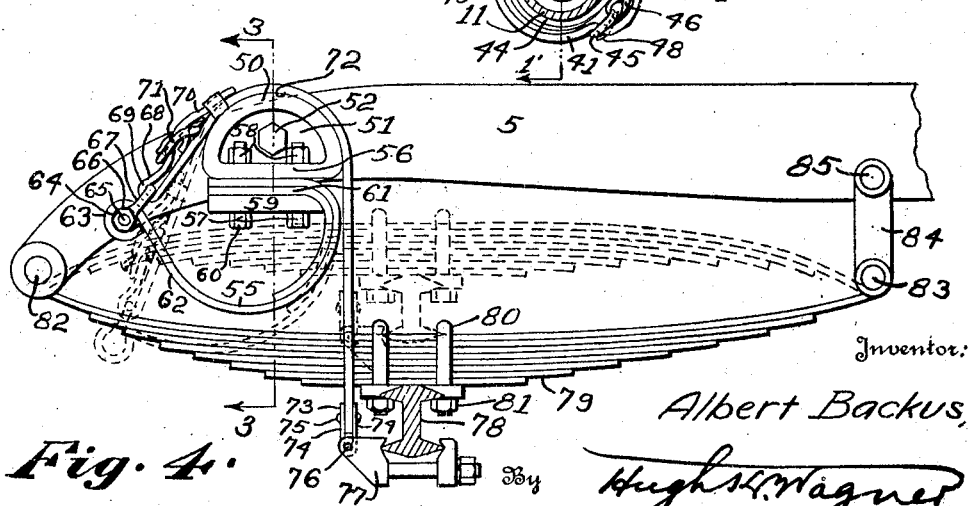
Figure 4 is a side elevation showing another form of this invention applied to the outside of the front frame of a motor vehicle.

An alternate form of this invention especially applicable to the front end of a motor vehicle is shown in Figures 3 and 4. A semi-cylindrical drum 50 has an end wall 51 which abuts against the outside of the frame side-member 5 and is secured thereto by a bolt 52 passing through a hole 53 in the end wall 51 and the frame side-member 5. Bolt 52 has a nut 54. A leaf-spring 55 is secured to the under side of the bottom wall 56 of the drum 50 by means of bolts 57 and nuts 58, a plate 59 being interposed between the bolt heads 60 and the thick end 61 of the spring 55. The spring 55 passes backward from the plate 59 and curves downward and then forward, its thin end 62 terminating in a loop 63, in which is secured bushing 64, in which pivots a bolt 65 passing through the eyes 66 of the clevis 67. A belt 68 is looped around the clevis 67 at 69, the free end 70 of the loop 69 being held in adjusting buckle 71. The belt 68 passes from clevis 67 around the semi-cylindrical face 72 of the drum 50, and thence down to U-shaped strap 73, between the side members 74 of which it is secured by rivets 75. Strap 73 loops around pin 76 secured in member 77 clamped to the front axle 78, which in turn is secured to the front leaf spring 79 of the car by clips or U-bolts 80 and nuts 81, the forward end of the spring 79 being pivoted at 82 to the frame side member 5, and the rear end pivoted at 83 to shackle 84 pivoted at 85 to frame-side-member 5. The normal position is shown in full lines, while the abnormal position of the parts is shown in dotted lines, the belt 68 passing around the drum 50 during both the ascending and descending movements, but damping only the rebound by its braking action.

Having thus described this invention, I hereby reserve the benefit of all changes in form, arrangement, order, or use of parts, as it is evident that many minor changes may be made therein without departing from the spirit of this invention or the scope of the following claims.

I claim:

1. The combination with the frame side members and with the axle of a motor vehicle, of an arched bridge connecting the frame side members, of a device mounted on the arched bridge and having a flexible portion which permits free relative movement of the frame and axle from normal position, but frictionally slide upon the axle for damping the return movement of said members to normal position.

2. The combination with the frame side members and with the axle of a motor vehicle, of an arched cross-member connecting the frame side, an uneven U-shaped leaf spring having one end secured to the cross-member, and a belt passing over the axle and having one end connected to the said spring and the other end to the cross-member so that the belt will be held taut against the axle, that portion of said belt disposed between the axle and the spring being of smaller cross-section than the remainder of said belt.

3. In a recoil damping mechanism, the combination with a pair of members resiliently and relatively movable to one another, of a friction surface on one of the said members, a leaf spring having one end rigidly connected to the other of said members, and a belt doubled upon itself to form a loop at one end and a pair of free superposed ends at the other, the said belt passing over the said friction surface and having its free ends connected to the other of said members and its loop end connected to the free end of said spring.

4. In a recoil damping mechanism, the combination with a pair of members resiliently and relatively movable to one another, of a friction surface on one of the said members, a belt doubled upon itself to form superposed layers terminating in a loop at one end and a pair of free ends at the other, the said belt passing over the said friction surface so that one of its layers is disposed intermediately of the said surface and the other layer, and having its free ends connected to the other of said members, a buckle on that layer of the belt not contacting with the friction surface for adjusting the length of the said belt, and resilient means connected to the loop end of said belt for holding said belt taut.

5. The combination, with the frame side members and with the axle housing of a motor-vehicle, of a cross-member connecting the frame side members, a looped leaf spring arranged transversely of the cross member and whose shorter leaves are disposed on the inside of the loop, the said spring being secured at its thicker end to the cross-member and curving upwardly and over the said cross-member, and a belt having one end connected to the cross-member and the other end to the free end of said leaf spring, the said belt passing under the axle housing and utilizing the housing as a brake drum to retard the rebound of the vehicle.

6. The combination with the frame side members and with the axle housing of a motor-vehicle, of a cross-member connecting the frame side members, a pair of looped leaf springs disposed transversely of the cross-member and each having one end secured to the cross-member in juxtaposition to a respective side member, a pair of belts, each disposed adjacent a respective side member and passing under the axle housing and each having one end connected to a corresponding end of the cross-member and the other end connected to a free end of a respective leaf spring, whereby the said belts slide freely over the axle housing while the vehicle springs are being compressed, but frictionally engage said belt with the housing to dampen the rebound of the vehicle.

7. The combination with a motor vehicle having frame side members and an axle housing provided with an intermediate enlargement for a differential gear, of a cross-member connecting the frame side members and having an intermediate arched portion for the purpose of clearing the said enlargement, a pair of looped leaf springs arranged at opposite ends of the cross-member and each having one end rigidly secured thereto, a pair of belts arranged at opposite ends of the cross-member and each having one end secured thereto and the other end to the free end of a respective leaf spring, the said belts passing under the axle housing and engaging the same to check the rebound of the vehicle, but permitting the vehicle springs to compress freely.

In testimony whereof I hereunto affix my signature.

ALBERT BACKUS.